Patented Feb. 12, 1952

2,585,529

UNITED STATES PATENT OFFICE 2,585,529

ISOPROPENYL FLUORIDE POLYMERS

Paul R. Austin, Wilmington, Del., assignor to E. I. du Pont de Nemours & Company, Wilmington, Del., a corporation of Delaware No Drawing. Application July 30, 1946, Serial No. 687,203

9 Claims. (Cl. 260—78.5)

This invention relates to a new chemical product, to polymers thereof and to methods for their preparation. More particularly this invention relates to a new fluoroolefin and its polymerization.

It is an object of this invention to provide a new fluoroolefin and methods for its preparation. A further object of this invention is to provide new polymers and copolymers. Other objects will appear hereinafter.

These and other objects of this invention are accomplished by the preparation of the new composition of matter, isopropenyl fluoride, its polymers and copolymers. The new compound, isopropenyl fluoride, can be prepared by elimination of halogen from a 2-fluoropropane containing at least two and not more than three halogen atoms. As illustrative of this process, 2,2-difluoropropane can be rehydrofluorinated and 1,2-dichloro-2-fluoropropane can be dechlorinated to yield isopropenyl fluoride. The polymerization of isopropenyl fluoride alone and in combination with ethylenically unsaturated polymerizable monomers is also an important part of this invention.

Dehydrofluorination of 2,2-difluoropropane by thermal cracking or pyrolysis is the preferred method of preparing isopropenyl fluoride since high yields at good conversion are readily obtained. The temperatures employed will, of course, vary with the amount of 2,2-difluoropropane processed in a given apparatus per unit of time, but in general good results are obtained in a temperature range of 500° to 1000° C.

This invention includes polymers and copolymers of isopropenyl fluoride as well as the monomer. In practicing this invention any of the conventional polymerization processes including bulk, solution, suspension, emulsion and granulation techniques can be used. Solution and suspension polymerization procedures involving use of pressures in the range of 50 to 7500 atmospheres give good results. Any of the catalysts known for the addition-polymerization of ethylenically unsaturated compounds can be used.

In the preparation of copolymers, isopropenyl fluoride can be interpolymerized with any other ethylenically unsaturated monomer capable of addition-polymerization. By ethylenically unsaturated monomer is meant a compound containing an aliphatic or alicyclic carbon-to-carbon double bond.

Copolymers having two or more components can be prepared by copolymerization of isopropenyl fluoride with one or more other polymerizable ethylenically unsaturated monomers. Vinyl compounds are preferred since they readily form desirable copolymers with isopropenyl fluoride. The copolymer of isopropenyl fluoride with ethylene is particularly preferred because of its desirable properties.

At least 5% of each of the comonomers should be present in the copolymer to obtain marked changes in properties. Introduction of 5 to 50% of isopropenyl fluoride in the copolymer produces optimum effects. For example, an ethylene-isopropenyl fluoride copolymer containing 26.8% of isopropenyl fluoride has a melting point much below that of similarly prepared polyethylene, and hence is inherently more useful in many applications.

This invention is further illustrated by the following examples in which parts are given by weight unless otherwise specified.

Example I

In a glass reaction vessel fitted with a sealed stirrer, reflux condenser, and dropping funnel are placed 425 parts of anhydrous ether and 20 parts of magnesium powder. Then iodine (18.5 parts) is gradually aded with continued stirring until it has reacted with the magnesium. The top of the condenser is connected to a trap cooled with ice and this in turn is connected to a trap cooled with Dry Ice and acetone. The outlet of the trap cooled with Dry Ice is protected with an open tube containing calcium chloride to prevent the entrance of moisture into the system. Ninety-five parts of 1,2-dichloro-2-fluoropropane (Henne and Haeckl, J. Am. Chem. Soc. 63, 2692 (1941)) is slowly added through the dropping funnel. The ether is kept refluxing during this addition. The mixture is then allowed to stir for 18 hours longer. The product collected in the trap cooled by Dry Ice is distilled through a low temperature column and contains 28 parts of isopropenyl fluoride boiling at −24.0° C. at 757 mm. molecular weight: calculated, 60.07; found, 59.7 (Edwards gas density method). The infrared spectrum of the gas indicates the presence of a double bond and the compound reacts with bromine to form 1,2-dibromo-2-fluoropropane.

Example II

A 28-inch length of a ⅛" Inconel pipe is fitted with welded connections so that it can be heated electrically. The connections are so placed to give a heated zone having a length of 8 inches. The pyrolysis tube is mounted on a transite panel, a copper-Constantan thermocouple is fitted to the external surface of the reactor, and the tube and thermocouple are insulated by covering them with a magnesia-asbestos pipe covering mixture. A Powerstat, Micromax and transformer are included in the electrical circuit to assist in maintaining the temperature at the desired level. The inlet of the pyrolysis tube is connected to a rotameter and to a manometer, which serves as a back-pressure gauge. The end of the tube is connected to the following in the order mentioned: a pipe packed with 2,000 parts soda lime, a wet test meter, a tower packed with calcium chloride, a tower packed with phosphorus pentoxide and a trap cooled with Dry Ice and acetone. The outlet of the trap is connected to a tube containing calcium chloride to prevent the entrance of moisture into the system.

A cylinder of nitrogen is connected to the apparatus and a slow stream of gas is passed through the system as the reactor is brought to temperature. The nitrogen cylinder is then replaced with one containing 2,2-difluoropropane. The fluorohydrocarbon is passed through the system at a rate to give a contact time of 0.5 second. Ninety-four parts of 2,2-difluoropropane is passed through the reactor over a period of 60 minutes with the tube maintained at an average temperature of 731° C. This yields 80.5 parts of material which is collected in the cold trap. Fractional distillation of this product in a low temperature distillation apparatus yields 33 parts of material boiling at −24 to −22° C., 9 parts of material boiling at −22 to 0° C., and 36 parts of material boiling at 0° C. Molecular weight and infrared absorption measurements indicate that the product boiling at −24 to −22° C. is isopropenyl fluoride. The product boiling at −22 to 0° C. is a mixture of isopropenyl fluoride and 2,2-difluoropropane and that boiling at 0° C. is 2,2-difluoropropane. If it is assumed that the fraction boiling at −22° C. to 0° C. is 2,2-difluoropropane for purposes of calculation, the 33 parts of isopropenyl fluoride obtained corresponds to a 42% conversion of 2,2-difluoropropane to isopropenyl fluoride and 90% of the theoretical yield. Traces of methylacetylene can be removed by passing the material boiling at −24 to −22° C. through two scrubbers filled with ammoniacal cuprous chloride solution, a scrubber filled with water, and a scrubber filled with 50% aqueous sulfuric acid, and then through calcium chloride and phosphorus pentoxide. The product is collected in a trap cooled with Dry Ice and acetone, and redistilled. The fraction boiling at −24° C. is pure isopropenyl fluoride.

The preparation of 2,2-difluoropropane by hydrofluorination of methylacetylene is described by Grosse, A. H., and Linn, C. B., J. Am. Chem. Soc. 64, 2289 (1942). The 2,2-difluoropropane used as starting material for the preparation of isopropenyl fluoride can also be prepared by the hydrofluorination of allene by the procedure given below.

A silver reactor is fitted with an oil-sealed nickel stirrer, a copper-Constantan thermocouple, an inlet line which is connected to a mercury bubbler, and an off-gas line connected to a drying tube packed with calcium chloride and a water bubbler. The reactor, surrounded by a bath of Dry Ice and acetone, is charged to 30% of its capacity with 100 parts of substantially anhydrous liquid hydrogen fluoride. Allene is then introduced into the stirred liquid hydrogen fluoride by connecting the mercury bubbler to a pressure bottle containing allene and allowing the allene to distill through the bubbler into the reactor. In this manner, 10 parts of allene is added over a period of 25 minutes. During the addition, the temperature rises from −76° to −69° C. The reaction mixture is then stirred for 30 minutes more and worked up. The off-gas line is connected to a bubbler containing 100 parts of 5% aqueous sodium hydroxide solution, a tower packed with soda lime, a tower packed with calcium chloride, and a trap cooled with Dry Ice and acetone. The open part of the trap is connected to a tube packed with calcium chloride to prevent entrance of moisture into the system. A dropping funnel is connected to the inlet line and 100 parts of water added dropwise to the reaction mixture. After all the water is added, the cooling bath is removed and the reactor is allowed to warm to room temperature. As the temperature approaches 0° C., the boiling point of 2,2-difluoropropane, a gaseous product distills from the reactor into the cold trap. The system is then swept with nitrogen to insure removal of all gaseous products from the system. In this way 10.5 parts of product is obtained in the cold trap. This material is transferred to a low-temperature, fractional distillation apparatus and distilled. In this manner there is obtained 10 parts of 2,2-difluoropropane.

*Example III*

A stainless-steel pressure vessel is flushed with oxygen-free nitrogen and charged to 20% of its capacity with 0.2 part of $\alpha,\alpha'$-azodiisobutyronitrile and 20 parts of deoxygenated water. The vessel is then cooled in Dry Ice and acetone and evacuated. Twenty parts of isopropenyl fluoride is passed into the vessel. The reactor is heated to 70° C. and sufficient deoxygenated water is injected to give a pressure of 80–90 atmospheres. The charge is shaken under these conditions for 16 hours. After this time, the tube is bled down and opened. Two parts of a soft, tacky polymer is obtained. The polymer has an intrinsic viscosity of 0.04 and analyzes for polyisopropenyl fluoride.

*Example IV*

A stainless-steel pressure vessel flushed with oxygen-free nitrogen is charged to 5% of its capacity with 0.1 part of di(tertiary butyl)peroxide and 20 parts of deoxygenated water. The vessel is cooled in a bath of Dry Ice and acetone and evacuated. One hundred parts of isopropenyl fluoride is then passed into the reactor. The reactor is heated to 140° C. and sufficient deoxygenated water is injected to give a pressure of 260–300 atmospheres. The mixture is shaken under these conditions for 16 hours. The unreacted isopropenyl fluoride is then bled off and the tube opened. Two parts of polyisopropenyl fluoride is obtained. The viscous, tacky polymer has an intrinsic viscosity of 0.17.

*Example V*

A pressure vessel is charged with 76 parts of cyclohexane containing 1% of $\alpha,\alpha'$-azodiisobutyronitrile and 101 parts of isopropenyl fluoride. This charge is pressured to 7,000 atmospheres and heated to a temperature of 60° C. These conditions are maintained for 65 hours. The reactor is then opened and the polymer removed. Twenty-one parts of polyisopropenyl fluoride with an intrinsic viscosity of 0.07 is obtained. Analysis: Calculated for $(C_3H_5F)_x$: C, 59.98%, H, 8.39%; Found C, 59.42%, H, 8.27%.

Example VI

A stainless-steel pressure vessel is flushed with oxygen-free nitrogen and charged to 42% of its capacity with 50 parts of deoxygenated water, 0.2 part of disodium phosphate, 0.1 part of ammonium persulfate, 0.02 part of sodium bisulfite, cooled, evacuated and then charged with 10 parts of isopropenyl fluoride. The tube is agitated by a reciprocating motion at 60–63 C. for 12.5 hours. After this time the tube is opened and the soft and somewhat tacky polymer of isopropenyl fluoride is filtered off and dried.

Example VII

A stainless-steel pressure vessel is flushed with oxygen-free nitrogen and charged to 20% of its capacity with 0.2 part of $a,a'$-azodiisobutyronitrile and 20 parts of deoxygenated water. The vessel is then cooled in Dry Ice and acetone bath and evacuated. Ten parts of ethylene and 10 parts of isopropenyl fluoride are charged into the vessel. The reactor is heated to 70° C. and sufficient deoxygenated water is injected into the vessel to give a pressure of 550–650 atms. After shaking the charge for 15 hours under these conditions, the gaseous products are bled off and the reactor opened. A wax-like ethylene/isopropenyl fluoride copolymer (3.2 parts) containing 26.8% of isopropenyl fluoride is obtained. The copolymer melts at 48–56° C. in contrast with a melting point of 110–120° C. for polyethylene prepared under similar conditions.

Example VIII

A glass pressure vessel is flushed with nitrogen and charged with 5 parts of isopropenyl fluoride, 5 parts of acrylonitrile and 0.1 part of $a,a'$-azodiisobutyronitrile. The vessel is sealed and heated at 60° C. for 24 hours. At the end of this time, the vessel is opened and solid polymer removed. There is obtained 6 parts of a yellow powder containing 14.5% of isopropenyl fluoride. This acrylonitrile/isopropenyl fluoride copolymer molds to a clear, transparent film. Polyacrylonitrile prepared under similar conditions cannot be molded into films in this manner.

Example IX

A glass pressure vessel is flushed with nitrogen and charged with 5 parts of isopropenyl fluoride, 5 parts of vinyl acetate and 0.1 part of $a,a'$-azodiisobutyronitrile. The vessel is sealed and heated at 60° C. for 24 hours. The vessel is then opened and the clear, transparent polymer removed. This copolymer with vinyl acetate contains 25.0% of isopropenyl fluoride.

Example X

A glass pressure vessel is flushed with nitrogen and charged with 5 parts of isopropenyl fluoride, 5 parts of methyl methacrylate and 0.1 part of $a,a'$-azodiisobutyronitrile. The vessel is then sealed and heated at 60° C. for 24 hours. At the end of this time, the vessel is opened and the clear, transparent polymer is removed. The methyl methacrylate/isopropenyl fluoride copolymer contains 10.1% of isopropenyl fluoride and molds to a clear transparent film.

Example XI

A glass pressure vessel is flushed with nitrogen and charged with 5 parts of isopropenyl fluoride, 5 parts of styrene and 0.1 part of benzoyl peroxide. The vessel is sealed and heated at 60° C. for 5 days. The vessel is then opened and the dark brown polymer removed. The styrene/isopropenyl fluoride copolymer contains 9.8% of isopropenyl fluoride.

Example XII

Twenty parts of distilled water, 0.2 part of ammonium persulfate, 0.04 part of sodium bisulfite, 10 parts of methyl methacrylate and 7 parts of isopropenyl fluoride are charged into a glass pressure vessel. The vessel is heated and agitated at 45–55° C. for 16 hours. At the end of this time the vessel is opened and the excess methyl methacrylate is removed by steam distillation. There is obtained 3 parts of a methyl methacrylate copolymer which contains 3.3% of isopropenyl fluoride.

As illustrated in the examples, isopropenyl fluoride can be prepared by removal of halogen from a 2-fluoropropane containing 2 halogen atoms attached to the 2-carbon atom and not more than 3 halogen atoms.

Although isopropenyl fluoride is preferably prepared by pyrolysis of 2,2-difluoropropane, it can also be prepared by dehalogenation of compounds of the type $XCH_2CFXCH_3$, where X is halogen of atomic weight greater than 20. The dehalogenation is preferably carried out by treatment with magnesium, especially in the presence of iodine as shown in Example I. Zinc or a zinc-copper couple in admixture with acetamide or an aliphatic alcohol, such as ethanol, butanol, or benzyl alcohol can also be used to promote dehalogenation. Use of acetamide permits a higher reaction mixture temperature at atmospheric pressure and thus makes for a more rapid reaction under these conditions. In methods involving dehalogenation of compounds of the type $XCH_2CFXCH_3$, the dechlorination of

$$ClCH_2CFClCH_3$$

is preferred since good yields of isopropenyl fluoride are obtained and the 1,2-dichloro-2-fluoropropane is readily accessible.

Examples of polymerization catalysts which can be used to produce the polymers and copolymers of this invention include catalysts which yield free radicals, as do peroxy and azo compounds, ionic or Friedel-Crafts type catalysts, heat, and ultraviolet light. Specific catalysts in addition to those used in the examples include boron trifluoride and potassium persulfate. The free radical type of catalyst, that is one which generates free radicals under polymerization conditions, is preferred. In the polymerization of isopropenyl fluoride alone good results are obtained with peroxy type catalysts. Di(tertiary butyl) peroxide is especially preferred since its use leads to superior quality polyisopropenyl fluoride. In general, good results are obtained with from 0.05 to 5% of catalyst, the precise amount depending on the specific catalyst used and type of product desired.

Besides those used in the examples, ethylenically unsaturated monomers capable of addition-polymerization with isopropenyl fluoride include vinyl compounds such as vinyl fluoride; methyl acrylate; vinylacetylene and allylidene diacetate; butadiene; vinylidene compounds such as vinylidene chloride and vinylidene fluoride; and fluoroethylenes such as $F_2C=CXY$ where X is hydrogen, chlorine or fluorine and Y is chlorine or fluorine.

The polymerization temperature will of course vary with the catalyst and polymerization technique employed. In general, temperatures in the range of 0° to 200° C. give best results. For example, with di(tertiary butyl) peroxide, temperatures in the range of 125° to 200° C. are desirable while lower temperatures such as 0° to 70° C. are preferable with active catalysts such as α,α'-azodiisobutyronitrile or potassium azodisulfonate. Still lower temperatures are preferred with ionic type catalysts. In the preparation of copolymers, the choice of polymerization conditions will, of course, depend upon the comonomer used and also upon the end use to be made of the resulting product.

The polymers and copolymers of isopropenyl fluoride are useful as films, plastics, and as ingredients of coating compositions and adhesives. In addition to its use in the preparation of polymers, isopropenyl fluoride is also useful in the preparation of other organic compounds. For example, by reaction of isopropenyl fluoride with hydrogen chloride or chlorine, chlorofluorohydrocarbons can be obtained.

As many apparently widely different embodiments of this invention may be made without departing from the spirit and scope thereof, it is to be understood that I do not limit myself to the specific embodiments thereof except as defined in the appended claims.

I claim:

1. A copolymer of isopropenyl fluoride and ethylene containing at least 5% isopropenyl fluoride.

2. A copolymer of isopropenyl fluoride and vinyl acetate containing at least 5% isopropenyl fluoride.

3. A copolymer of isopropenyl fluoride and styrene containing at least 5% isopropenyl fluoride.

4. A method of preparing polyisopropenyl fluoride which consists in heating a mixture of isopropenyl fluoride, water and 0.05% to 5% of a peroxy catalyst to a temperature of 125° to 200° C., subjecting the mixture to a pressure of 50 to 7500 atmospheres, and agitating the mixture under said conditions of temperature and pressure for several hours.

5. A tacky homopolymer of isopropenyl fluoride having an intrinsic viscosity of 0.04 to 0.17.

6. A method of preparing organic addition polymers characterized by the presence of polymerized isopropenyl fluoride which comprises polymerizing, in the presence of 0.05% to 5% of a free radical type of catalyst at a temperature in the range of 0° to 200° C., ethylenically unsaturated monomeric material selected from the group consisting of isopropenyl fluoride and a mixture consisting of isopropenyl fluoride and a member of the group consisting of ethylene, acrylonitrile, vinyl acetate, styrene, vinyl fluoride, methyl acrylate, vinyl acetylene, allylidene diacetate and butadiene, said mixture containing at least 5% isopropenyl fluoride.

7. A process as defined in claim 6 in which the catalyst is an azo compound.

8. A process as defined in claim 6 in which the catalyst is a peroxy compound.

9. A fluorine-containing organic addition polymer of ethylenically unsaturated monomeric material selected from the group consisting of isopropenyl fluoride and a mixture consisting of isopropenyl fluoride and a member of the group consisting of ethylene, acrylonitrile, vinyl acetate, styrene, vinyl fluoride, methyl acrylate, vinyl acetylene, allylidene diacetate and butadiene, said mixture containing at least 5% of isopropenyl fluoride.

PAUL R. AUSTIN.

REFERENCES CITED

The following references are of record in the file of this patent:

UNITED STATES PATENTS

| Number | Name | Date |
|---|---|---|
| 2,301,952 | Jacobi et al. | Nov. 17, 1942 |
| 2,337,681 | Pollack | Dec. 28, 1943 |
| 2,362,960 | Thomas | Nov. 14, 1944 |
| 2,401,850 | Whitman | June 11, 1946 |
| 2,406,717 | Thomas | Aug. 27, 1946 |
| 2,464,062 | Strain | Mar. 8, 1949 |

OTHER REFERENCES

Meslans, Compt. rend. 111, pages 882, 3 (1890).